W. Willmot.
Wheel Cultivator.
Nº 22,215.  Patented Nov. 30, 1858.
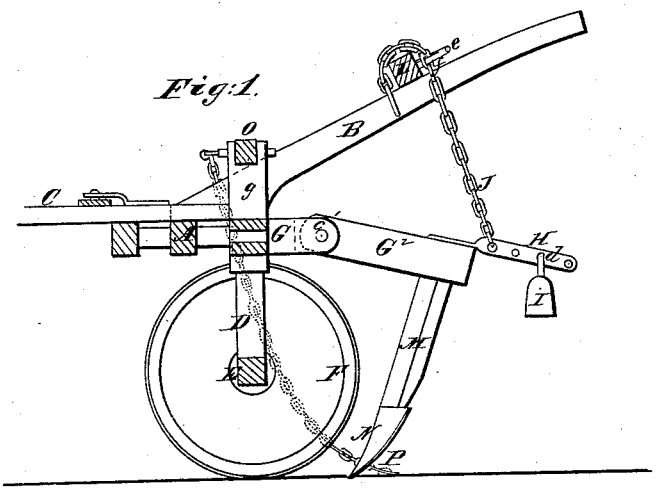
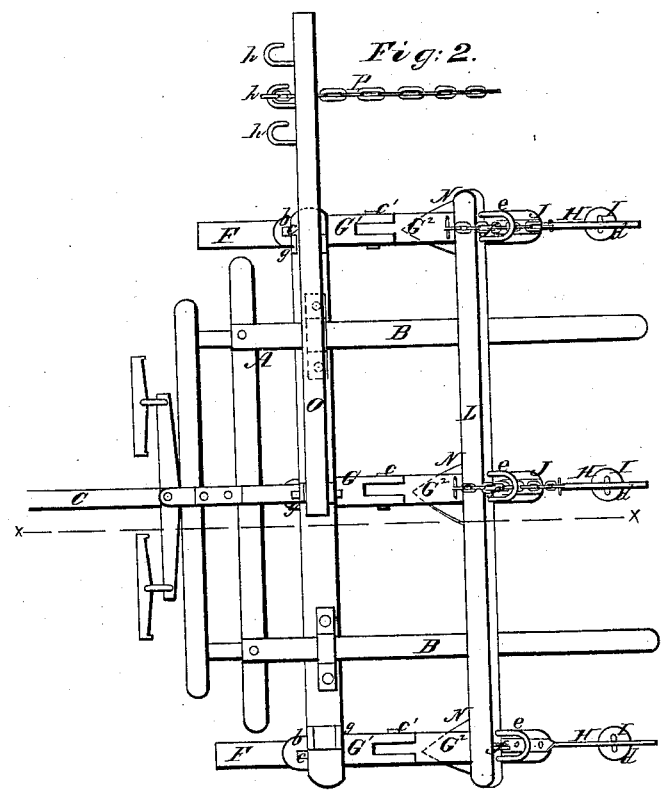

UNITED STATES PATENT OFFICE.

WM. WILLMOT, OF WILMINGTON, DELAWARE.

IMPROVEMENT IN CULTIVATORS.

Specification forming part of Letters Patent No. 22,215, dated November 30, 1858.

*To all whom it may concern:*

Be it known that I, WILLIAM WILLMOT, of Wilmington, in the county of New Castle and State of Delaware, have invented a new and Improved Furrowing Device for Furrowing or Drilling Land to Receive Seed to be Planted; and I do hereby declare that the following is a full, clear, and exact description of the same, reference being had to the annexed drawings, making a part of this specification, in which—

Figure 1 is a vertical section of my invention, taken in the line $x\ x$, Fig. 2. Fig. 2 is a plan or top view of the same.

Similar letters of reference indicate corresponding parts in the two figures.

To enable those skilled in the art to fully understand and construct my invention, I will proceed to describe it.

A represents a horizontal frame, having two handles, B B, attached to it at right angles. To the front end of the frame the draft-pole C is attached. The frame A is attached by pendants D to an axle, E, which has a wheel, F, at each end.

To the back end of the frame A, and at its center, a horizontal bar, G, is permanently attached. Two similar bars, G' G', are attached to the back of the frame, one near each end, and these bars have tenons $b$ formed on their front ends, said tenons fitting in slots made longitudinally in the back of the frame, and of sufficient length to permit the bars G' G' to have a requisite degree of lateral movement or adjustment, the bars G' being secured at the desired points by keys $c$.

To the outer end of each bar G G' G' a bar, G², is attached by a joint, $c'$, and to the outer end of each bar G² a metal perforated bar, H, is attached, each bar H having a weight, I, suspended to it by a hook, $d$.

To each bar H a chain, J, is attached, and these chains pass through staples $e$, attached to a bar, L, which is secured to the handles B B, near their outer parts, the bar L also having pins $f$ driven in it for the purpose of attaching the chains thereto when necessary.

To the outer end of each bar H, and to their under sides a pendent bar, M, is attached, and to the lower ends of the bars M teeth or shares N are attached, one to each. These teeth or shares are of the usual shovel form.

To the frame A three uprights, $g\ g\ g$, are attached, one at the center and one at each end. In the upper part of the center upright $g$ a bar, O, is pivoted, the bar being allowed to turn freely on its pivot. The upper end of the two uprights $g\ g$ at the ends of the frame A are slotted vertically, so that either may receive the bar O. In the outer part of the bar O a series of staples, $h$, are driven, to either of which a chain, P, is attached.

The operation will be readily seen: As the machine is drawn along the shares N are made to penetrate the earth and form furrows of the requisite depth by means of the weights I, which are adjusted on the bars H at a greater or less distance from their outer ends to effect the desired result. The handles B B are grasped by the operator or attendant, and in case the shares are not designed to operate they are kept in an eleveted state by hooking the chains J sufficiently high on the pins $f$. The shares N are placed nearer together or farther apart by adjusting the bars G' in the frame A. The chain P is so adjusted that it will, by dragging into the last furrow made at the previous "round" or "bout," insure the furrows being made at equal distances apart, and by turning the bar O so that it will project over or beyond the opposite side of the machine the chain is allowed to perform the same office at the succeeding bout.

The within-described device may be used separately for furrowing land, or it may be used as an attachment to any seed-drill or seed-planting device.

Having thus described my invention, what I claim as new, and desire to secure by Letters Patent, is—

The arrangement and combination of the bars G G' G², bars H, adjustable weights I, chains J, bars L, and handles B, as and for the purposes herein shown and described.

WM. WILLMOT.

Witnesses:
 A. V. BIDERMANN,
 WILLIAM L. LOWTHER.